No. 820,040. PATENTED MAY 8, 1906.
O. H. FAY.
BATTERY PLATE.
APPLICATION FILED AUG. 19, 1904.
2 SHEETS—SHEET 1.
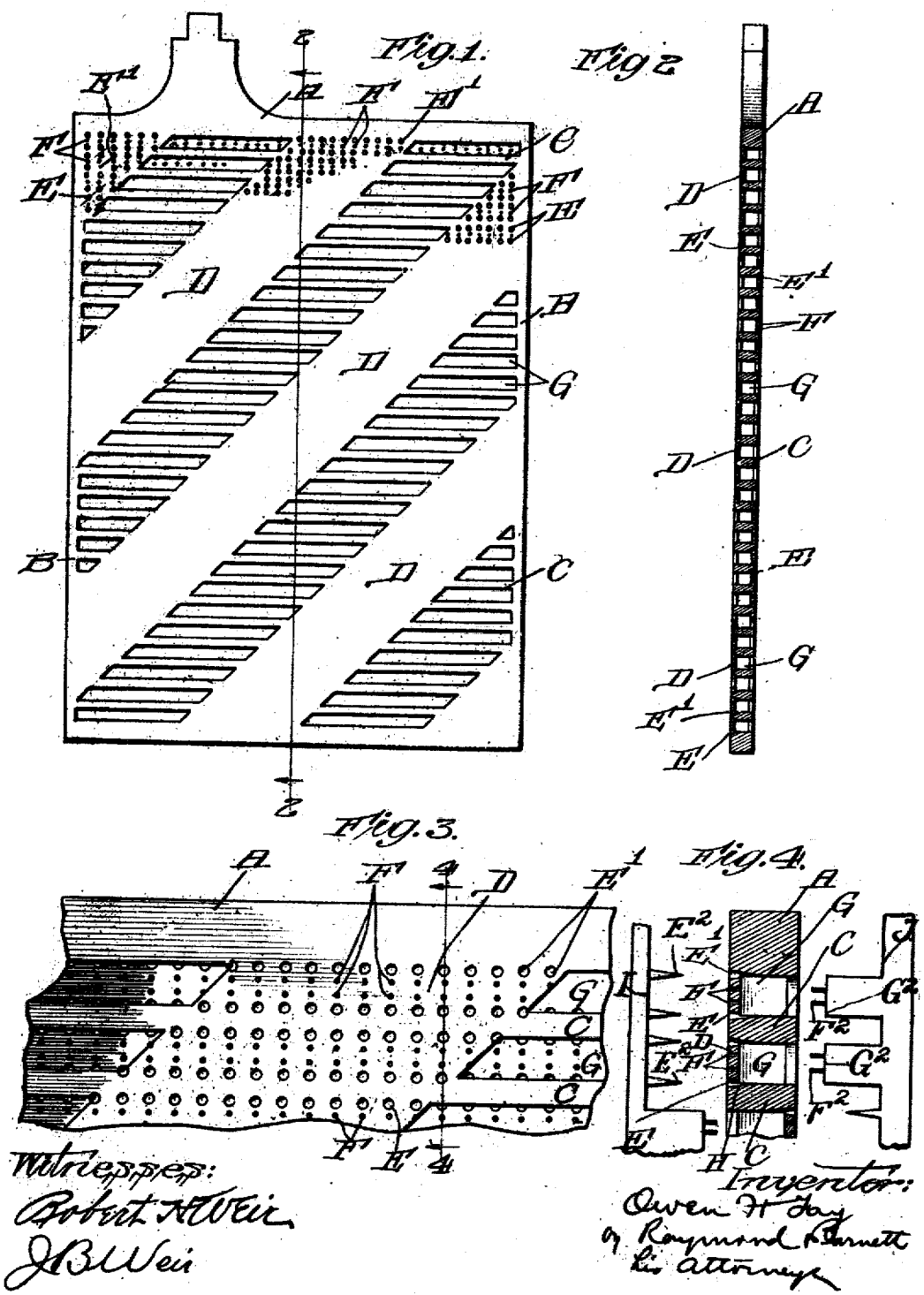

No. 820,040. PATENTED MAY 8, 1906.
O. H. FAY.
BATTERY PLATE.
APPLICATION FILED AUG. 19, 1904.
2 SHEETS—SHEET 2.
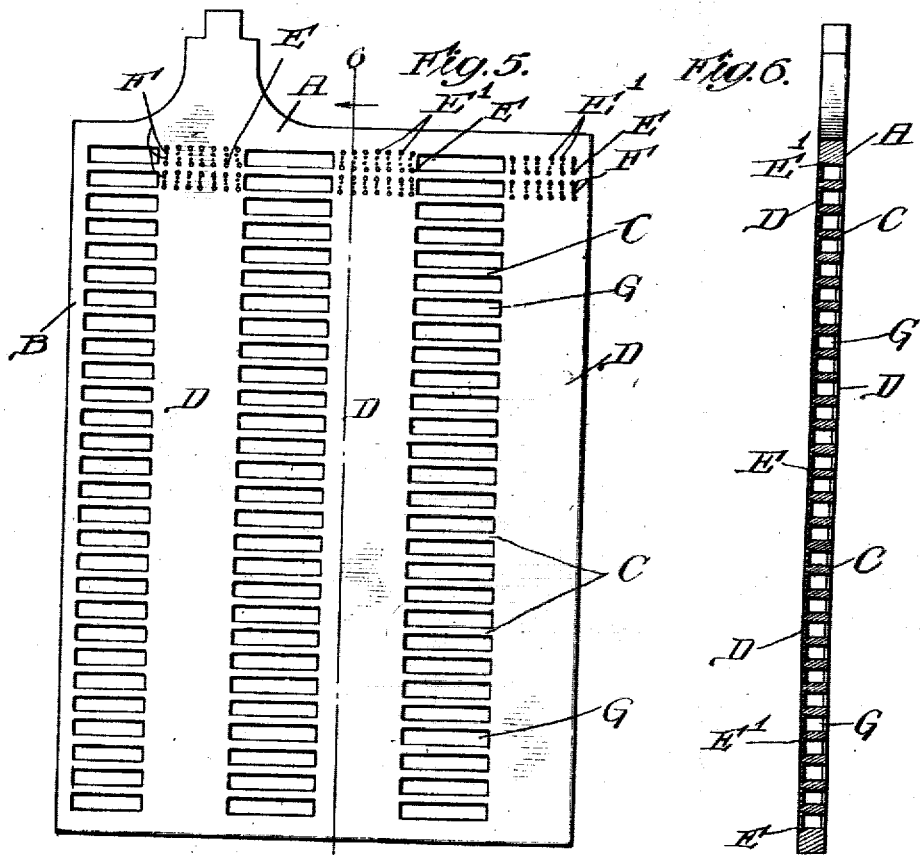
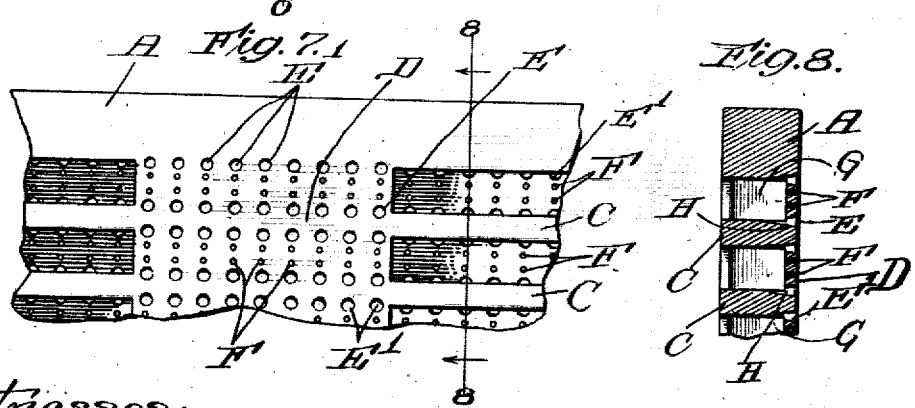
Witnesses:
Robert H. Weir
J. B. Weir
Inventor
Owen H. Fay
by Raymond Barnett
his attorney

UNITED STATES PATENT OFFICE.

OWEN H. FAY, OF CHICAGO, ILLINOIS.

BATTERY-PLATE.

No. 820,040.  Specification of Letters Patent.  Patented May 8, 1906.

Application filed August 19, 1904. Serial No. 221,384.

*To all whom it may concern:*

Be it known that I, OWEN H. FAY, a citizen of the United States, residing at Chicago, in the county of Cook and State of Illinois, have invented certain new and useful Improvements in Battery-Plates, of which the following is a specification.

My invention relates to that particular type of electrical secondary or storage battery plates which are designated as "Faure" or pasted plate type, in which a lead oxid or some other similar medium is employed as an active material in connection with the grid.

In storage batteries of this type much difficulty is encountered in providing means for holding the active material in proper position upon the plate or grid. When the electrode with this applied material is subjected to the influences of expansion and contraction in the charging, the metallic grid or support is subjected to a strain, causing warping or buckling. The action of the electrolytic fluid on the active material tends to disintegrate it, and unless the grid is so constructed as to securely retain it in place some of the active material will separate from the main body and accumulate at the bottom of the cell. This will tend to cause short-circuiting and will also serve to still further warp the grid. This warping of the grid will also cause the dislocation of more active material, the accumulation of which at the bottom of the cell will increase the danger from short-circuiting and greatly shorten the life of the grid, besides destroying the efficiency of the electrode.

In order to obtain the most desirable results and attain the greatest efficiency for the battery, it is essential that while the active material or material to become active must be securely retained on the grid free and open places must be provided through which the electrolyte may find free circulation to attack and act upon the active material.

My invention has for one object the provision of means whereby the active material or material to become active shall be firmly secured and held against dislodgment in the electrode under the influence of the charge and discharge of the electromotive force.

A further object of my invention is to provide means for the free circulation and penetration of the electrolyte in and around the outer and subjacent exposed surfaces of the material.

A further object of my invention is the prevention of buckling the plate, with a consequent loss of electromotive force.

These and other objects as may hereinafter appear are attained by the devices shown in the accompanying drawings, in which—

Figure 1 is a plan view of one form of my grid. Fig. 2 is a sectional view along the line 2 2 of Fig. 1 looking in the direction indicated by the arrows. Fig. 3 is an enlarged plan view of a portion of Fig. 1. Fig. 4 is a sectional view along the line 4 4 of Fig. 3 looking in the direction indicated by the arrows. Fig. 5 is a plan view of a modified form of my grid. Fig. 6 is a sectional view along the line 6 6 of Fig. 5 looking in the direction indicated by the arrows. Fig. 7 is an enlarged plan view of a portion of Fig. 5. Fig. 8 is a sectional view along the line 8 8 of Fig. 7 looking in the direction indicated by the arrows, showing the mold just withdrawn from the plates.

Like letters of reference indicate like parts in the different figures of the drawings.

Referring by letter to the accompanying drawings, A represents the body of the grid, which constitutes a support for the active material or material to become active. This grid, which is shown as constructed with solid edges B, is made up of a series of longitudinal bars, which, while they may be of any other shape, are here shown as rectangular. On either face of this grid are strips D, which in Fig. 1 are shown as extending diagonally across the face, with the strips on opposite faces in staggered relation to each other. In Fig. 5 I have shown the strips extending vertically; but it is evident that the strips may be placed in various positions and occupy various relations to each other without departing from the spirit of my invention. These strips, which are preferably cast integral with the bars, are provided with a series of openings E and E'.

If desired, supplemental holes or openings F, of the same or different size as E, may be provided. In the drawings I have illustrated the openings F as being smaller than the openings E E'; but I do not so limit myself to this precise construction. The bars C, in connection with the back plate D, form a series of pockets G, which are filled with active material or material to become active.

The openings E, E', and F serve the double purpose of keying the active material in place and also of allowing the electrolytic fluid to more readily reach the rear ends of the pockets G.

The openings F are ordinary perforations or holes; but the openings E are so formed as to represent in longitudinal cross-section the form of a triangle. These openings are so formed as to extend into the rear portion of the bars C, and the lower sides of these conical openings form the bottoms H of flaring grooves that extend rearwardly through the upper and lower faces of the bars C. In the case of the openings E' the upper sides of these conical openings serve to form flaring grooves in the lower faces of the bars C. The openings E E' are shown in the drawings as circular; but it is evident that a square or other shaped opening could also be made, which would at the same time form a similar rearwardly-flaring groove in the bar C.

In Fig. 4 I have shown portions of opposite sides of the molds I J, from which my plate shown in Fig. 5 is made, showing at the same time a cross-section of the plate from which the molds have been withdrawn. In this figure, E² F² represent the pins that form the openings E, E', and F, and the lug or offset G² forms the pocket G. The condition and shape of these pins and lugs may be changed to provide different forms of plates that come within the spirit of my invention.

I claim—

1. A battery-plate, comprising end bars, a series of longitudinal bars provided with a series of rearwardly-flaring grooves, and a series of strips extending across the opposite faces of the plate, and in staggered relation to each other.

2. A battery-plate comprising end bars, a series of longitudinal bars, a series of strips extending across the faces of the plate, the strips on the opposite sides being in staggered relation to each other, and a series of pockets formed between said bars, the strips forming the bottoms of the pockets.

3. A battery-plate comprising end bars, a series of longitudinal bars, a series of perforated strips extending across the faces of the plate, the strips on the opposite sides being in staggered relation to each other, and a series of pockets formed between said bars, the strips forming the bottoms of the pockets.

4. A battery-plate comprising end bars, a series of longitudinal bars provided with a series of rearwardly-flaring grooves, a series of strips extending across the faces of the plate, the strips on the opposite sides being in staggered relation to each other, and a series of pockets formed between said bars, the strips forming the bottoms of the pockets.

5. A battery-plate comprising end bars, a series of longitudinal bars provided with a series of rearwardly-flaring grooves, a series of perforated strips extending across the faces of the plate, the strips on the opposite sides being in staggered relation to each other, and a series of pockets formed between said bars, the strips forming the bottoms of the pockets.

OWEN H. FAY.

Witnesses:
F. H. DRURY,
O. R. BARNETT.